United States Patent
Miskovic et al.

(10) Patent No.: US 6,635,711 B1
(45) Date of Patent: Oct. 21, 2003

(54) MOISTURE-SETTING POLYURETHANE ADHESIVE FOR HYGIENE ARTICLES

(76) Inventors: Michel Miskovic, 6, Rue des Veneurs, Compiegne (FR), F-60200; François Bauduin, 47, Rue André Royer, Margny-les-Compiegne (FR), F-60280; Patrick Bouttefort, 102, Rue du 14 juillet, Margny-les-Compiegne (FR), F-60280; Jean-François Chartrel, 160, Rue de l'Abbé Dehue, Cuts (FR), F-60400

( * ) Notice: Subject to any disclaimer, the term of this patent is extended or adjusted under 35 U.S.C. 154(b) by 0 days.

(21) Appl. No.: 09/622,005

(22) PCT Filed: Dec. 17, 1998

(86) PCT No.: PCT/FR98/02762

§ 371 (c)(1),
(2), (4) Date: Aug. 11, 2000

(87) PCT Pub. No.: WO99/32535

PCT Pub. Date: Jul. 1, 1999

(30) Foreign Application Priority Data

Dec. 19, 1997 (FR) .............................. 97 16203

(51) Int. Cl.$^7$ .............................. C09J 175/06
(52) U.S. Cl. ................. 525/127; 428/423.1; 428/423.5; 428/423.7; 428/425.1; 442/57; 442/58; 156/331.4
(58) Field of Search .................. 525/127; 428/423.1, 428/423.5, 423.7, 425.1; 442/57, 58; 156/331.4

(56) References Cited

U.S. PATENT DOCUMENTS 3,931,077 A * 1/1976 Uchigaki .................. 524/272
4,808,255 A * 2/1989 Markevka .................. 525/127

FOREIGN PATENT DOCUMENTS

| CA | 2238412 | 5/1997 |
| DE | 196 46 879 | 5/1997 |
| EP | 0 383 505 | 8/1990 |
| JP | 56 116770 | 12/1981 |
| JP | 04 008786 | 2/1992 |
| WO | 97-19122 | * 5/1997 |

OTHER PUBLICATIONS

Derwent Abs 95–284038 Week 9538 of CA 2122942, Jun. 1995.*

* cited by examiner

Primary Examiner—Patricia A. Short
(74) Attorney, Agent, or Firm—Hunton & Williams LLP

(57) ABSTRACT

A moisture-crosslinkable polyurethane adhesive, comprising a) 70 to 95% by weight of a polyurethane prepolymer obtained by polyaddition of at least one polyol to at least one diisocyanate trimerized as isocyanurate and, b) 5 to 30% by weight of an essentially amorphous poly-α-olefin, the adhesive comprising a content of free NCO groups representing 1 to 20% by weight of the adhesive.

8 Claims, No Drawings

MOISTURE-SETTING POLYURETHANE ADHESIVE FOR HYGIENE ARTICLES

BACKGROUND OF THE INVENTION

Field of the Invention

The invention relates to a moisture-crosslinkable polyurethane adhesive which can be used in particular in the field of hygiene.

It is now commonplace to use fixing systems of the VELCRO® type to prepare disposable articles relating to the field of hygiene, in particular diapers for babies or incontinent adults and feminine hygiene articles. It is well known that the systems of the above-mentioned type contain two components: a first component composed of a multitude of fine hooks and a second component composed of a multitude of fine loops. By simply pressing on the superimposed components, the hooks are made to enter the loops, which makes it possible to obtain a solid assembly. The bonding between the two components can be broken by the application of a sufficient force. The two components can be assembled and separated several times without a significant decrease in the strength of the assembly.

In the specific case of disposable diapers, these fixing systems are arranged on the rear and front parts forming the belt of the diaper when it is worn by the user (see U.S, Pat. No. 5,176,670).

The component containing the loops is fixed to the front part of the diaper, the loops being directed outwards. This component is generally composed of a thin material based on polyolefin fibers or on other synthetic fibers, in particular a knitted fabric (also known as textile mesh). The component is generally provided in the form of a strip of variable size, optionally decorated with patterns, which is adhesively bonded to the outer covering of the diaper. This covering can consist of a film which is impermeable to liquids, for example a polyethylene or polypropylene film, or of a non-woven which is impermeable to liquids and permeable to vapor.

The adhesive bonding of the component containing the loops to the impermeable material can be carried out by means of thermoplastic adhesives of the polyolefin or urethane type (see CA-A 2,122,942) or of moisture-crosslinkable polyurethane adhesives.

The adhesive bonding is carried out industrially at a high rate, that is to say at a speed which can exceed 150 meters per minute. The adhesive-bonding devices operate by coating the impermeable material with the liquid adhesive and laminating the component containing the loops. The assembly, thus formed, is subsequently subjected to calendering and to winding off.

The amount of adhesive deposited must be carefully controlled: an amount which is too low does not make possible satisfactory adhesive bonding and an amount which is too high passes through the pores of the laminated component, with the risk of spreading over the loops, which is harmful to the fixing of the component containing the hooks.

It is economically advantageous to seek to limit the amount of adhesive while maintaining the performance of the adhesive bonding. To this end, the Applicant Company has sought to deposit the adhesive on the component containing the loops.

Under the abovementioned industrial conditions, the adhesives of the prior art have a tendency very quickly to no longer adhere to the component, which results in the adhesive wicking up on the dispensing device and the production line shutting down.

As regards adhesives based on moisture-crosslinkable polyurethanes, an additional constraint is imposed by the level of residual isocyanate monomer, which must be as low as possible for obvious toxicity reasons.

SUMMARY OF THE INVENTION

The Applicant Company has now found a novel adhesive which makes it possible to overcome these difficulties.

The invention relates to a moisture-crosslinkable polyurethane adhesive which comprises:

a) 70 to 95% by weight of a polyurethane prepolymer obtained by polyaddition of at least one polyol to at least one diisocyanate trimerized as isocyanurate and, b) 5 to 30% by weight of an essentially amorphous (poly-α-olefin, the content of free NCO groups representing 1 to 20% by weight of the adhesive.

The moisture-crosslinkable polyurethane adhesive preferably comprises:

a) 85 to 95% by weight of a polyurethane prepolymer obtained by polyaddition of at least one polyol to at least one diisocyanate trimerized as isocyanurate and, b) 5 to 15% by weight of an essentially amorphous polyolefin, the content of free NCO groups representing 1 to 10% by weight of the adhesive.

DETAILED DESCRIPTION OF THE PREFERRED EMBODIMENTS

The polyol participating in the formation of the prepolymer is generally chosen from polyether polyols, polyester polyols and unsaturated polyols.

The polyether polyols are generally chosen from aliphatic and aromatic polyether polyols and mixtures of these compounds. Their average molecular mass is preferably between 200 and 9000 and their hydroxyl functionality is preferably between 2 and 4.6.

Mention may be made, as examples of aliphatic polyether polyols, of oxyalkylated derivatives of diols, such as polypropylene glycols, or of triols, such as glycerol, trimethylolpropane and hexane-1,2,6-triol, polymers of ethylene, propylene or butylene oxide, copolymers of ethylene oxide and of propylene oxide, the above-mentioned compounds containing silanyl endings, and oxyalkylated diphenyl derivatives, such as derivatives oxyethylenated or oxypropylenated in the 4,4'-position of diphenylmethane.

Use is preferably made of oxypropylated derivatives of glycerol, polymers of propylene or butylene oxide, and copolymers of ethylene oxide and of propylene oxide.

The polyester polyols are generally chosen from aliphatic and aromatic polyester polyols and mixtures of these compounds. Their average molecular mass is preferably between 250 and 7000 and their hydroxyl functionality is preferably between 2 and 3.

Mention may be made, by way of examples, of the polyester polyols resulting from the condensation of aliphatic, cyclic or aromatic polyols, such as ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldimethanolamine and mixtures of these compounds, with an acid, such as 1,6-hexanedioic acid, dodecanedioic acid, azelaic acid, sebacic acid, adipic acid, 1,18-octadecanedioic acid, phthalic acid, succinic acid and mixtures of these acids, an unsaturated anhydride, such as maleic or phthalic anhydride, or a lactone, such as caprolactone.

Use is preferably made of the polyester polyols resulting from the condensation of ethanediol, 1,3-propanediol and/or 1,6-hexanediol with adipic acid and/or phthalic acid.

The unsaturated polyols are generally chosen from polyols and mixtures of polyols preferably having a molecular mass of between 1200 and 3000.

Mention may be made, by way of examples, of polybutadiene and polyisoprene containing hydroxylated endings.

The abovementioned polyols are advantageously amorphous.

The abovementioned polyols can also be used as a mixture with other hydroxylated compounds.

It is thus possible to use a monol or a mixture of monols, in particular poly(ethylene/butylene)monols, such as Kraton Liquid™ L-1203 Polymer, sold by Shell, or a polyol or a mixture of polyols chosen from poly(ethylene/butylene) diols, such as Kraton Liquid™ Polymer HPVM-2203, sold by Shell, copolymers of ethylene, of vinyl acetate and of 2-hydroxyethyl acrylate, such as Orevac® 9402, sold by Elf Atochem, indene/coumarone resins modified by phenol, for example Novares CA120, sold by VFT, and hydroxylated tackifying resins, for example Reagem, sold by DRT.

The abovementioned monol and the abovementioned polyol respectively represent 0 to 10% and 0 to 25% by weight of the polyols.

The diisocyanate trimerized as isocyanurate derives from diisocyanates chosen from the group composed of diphenylmethane 4,4'-diisocyanate, diphenylmethane 2,4'-diisocyanate and hydrogenation products of the abovementioned diisocyanates, toluylene 2,4-diisocyanate, toluylene 2,6-diisocyanate, hexamethylene diisocyanate, isophorone diisocyanate and naphthylene 1,5-diisocyanate and their mixtures.

A trimerized hexamethylene diisocyanate or a trimerized isophorone diisocyanate is preferred.

The diisocyanate trimerized as isocyanurate generally contains less than 0.2% by weight of free isocyanate monomers.

The polyurethane prepolymer is obtained by polyaddition of at least one polyol and of at least one diisocyanate trimerized as isocyanurate in amounts such that the content of isocyanate groups in the prepolymer is between 1 and 25% and preferably between 2 and 15% by weight.

The nature of the polyurethane prepolymer is capable of influencing the hardness of the adhesive according to the invention. In this respect, preference is given to the polyurethane prepolymers obtained by reaction:

of a mixture of polyols composed:
of 20 to 100% by weight of an aliphatic polyester polyol,
and of 0 to 80% by weight of an aliphatic/aromatic polyester polyol
and of at least one diisocyanate trimerized as isocyanurate.

Preference is particularly given to the polyurethane prepolymers obtained by reaction:

of a mixture of polyols composed:
of 30 to 50% by weight of an aliphatic polyester polyol, and of 70 to 50% by weight of an aliphatic/aromatic polyester polyol
and of at least one diisocyanate trimerized as isocyanurate.

The essentially amorphous poly-α-olefin (APAO) is generally chosen from polymers resulting from the copolymerization of monomers chosen from ethylene, propene, 1-butene and 1-hexene in the presence of a catalyst of Ziegler-Natta type and mixtures of these copolymers. Mention may be made, by way of examples, of Vestoplast®, in particular referenced 508, sold by Hüls, Eastoflex®, sold by Eastman Chemical, and Rextac®, sold by Rexen. Preference is given to copolymers having a molecular mass of between 7300 and 23,800 and a glass transition temperature of between −27 and −36° C. Use is advantageously made of copolymers having a ring-and-ball softening point (DIN Standard 52011) of between 80 and 160° C.

The moisture-crosslinkable adhesives according to the invention can comprise conventional additives known to a person skilled in the art, such as fillers, tackifying agents, plasticizers, adhesion promoters, such as compounds containing silanyl groups, and catalysts which accelerate the crosslinking by moisture, for example metal catalysts, such as dibutyltin dilaurate, or amine-containing catalysts, such as dimorpholinodiethyl ether.

The moisture-crosslinkable polyurethane adhesives according to the invention can be prepared by reacting the polyols and, if appropriate, the other hydroxylated compounds, optionally dehydrated at high temperature under vacuum, with the isocyanurates with the exclusion of moisture and, if appropriate, under a protective gas, at a temperature which can vary from 90 to 120° C. After the initiation of the reaction, the poly-α-olefin is added, by mixing, in the desired quantitative ratios and the reaction is allowed to continue until the desired NCO content is obtained. The optional additives are added, by mixing, to the adhesive thus obtained.

The moisture-crosslinkable polyurethane adhesives according to the invention are particularly suited to the industrial adhesive bonding of textile meshes, for example made of cellulose, of polyamide or of poly(ethylene terephthalate), and of plastic films, for example made of polyethylene, of polypropylene or of poly(ethylene terephthalate). This industrial adhesive bonding is generally employed at a high rate, that is to say with a speed of progression of the mesh which can exceed 150 meters per minute, or indeed more.

The adhesives according to the invention additionally exhibit a content of free isocyanate monomer of less than 0.15% by weight of the adhesive, a low vapor pressure at the temperature of use (100 to 130° C.) and consequently a limited toxic nature, an excellent trapping power (ability of adhesive to fix a material) and a good elasticity after crosslinking by moisture.

The following examples allow the invention to be illustrated.

EXAMPLE 1

The following compounds are introduced into a reactor under a nitrogen atmosphere:

29.1 parts by weight of hexamethylene diisocyanate isocyanurate (NCO content: 21.6±0.3%; Brookfield viscosity: 3250±750 mPa·s at 23° C.; free hexamethylene diisocyanate: <0.2% by weight; trade name: Desmodur® N3300-Bayer), 21.95 parts by weight of the condensation product of adipic acid and of a mixture of 2,2-dimethyl-1,3-propanediol, 1,2-ethanediol and 1,6-hexanediol (aliphatic polyester polyol; hydroxyl number: 18–24; molecular mass: 5000; OH functionality: 2;

trade name: Dynacoll® 7250-Hüls), 38.95 parts by weight of the condensation product of a mixture of 1,3-benzenedicarboxylic acid and adipic acid and of a mixture of 1,4-benzenedicarboxylate, 2,2-dimethyl-1,3-propanediol, 1,2-ethanediol and 3-hydroxy-2,2-dimethylpropyl 3 hydroxy-2,2-dimethylpropylproanate (aliphatic/aromatic polyester polyol; hydroxyl number: 31–39; molecular mass: 3000; OH functionality: 2; trade name: Dynacoll® 7130-Hüls).

The mixture is brought to a temperature of the order of 95 to 100° C. When the temperature is stable, 10 parts by weight of copolymer of ethylene, of 1-propene and of 1-butene (molecular mass: 11,800; glass transition temperature: −31° C.; viscosity at 190° C.: 7800 mPa·s; ring-and-ball softening point (DIN Standard 52011): 86° C.; trade name: Vestoplast® 508-Hüls) are introduced into the reactor.

After completion of the reaction, 0.01 part by weight of dibutyltin dilaurate (DBTL) is introduced. A white adhesive is recovered which is solid at 23° C. and which has an NCO content equal to 4.9%, measured according to AFNOR Standard T52-132.

At 130° C., the adhesive is a white liquid which exhibits a strong tackiness and a Brookfield viscosity equal to 23,000 mPa·s. On cooling, the adhesive exhibits high elasticity.

The mechanical properties of the adhesive obtained are defined by the tensile strength and the elongation at break, measured under the conditions hereinbelow.

The molten adhesive is poured at 100° C. onto silicone paper using a film drawer preheated to 100° C., in order to form a film with a length of 25 cm, a width of 9 cm and a thickness of 300 mm. The film is subjected to a temperature of 23° C. and a relative humidity of 50% until polymerization is complete (of the order of 4 weeks).

After having removed the silicone paper, the film is cut up with a hollow punch in order to form test specimens (H2 type-AFNOR Standard T46002), which are subjected to tension with a test machine (DY 30 type; Adamel-L'Homargy) at a constant rate of 100 mm/min. The measurements are carried out on 5 test specimens.

Tensile strength: 20±3 MPa

Elongation at break: 110±15%

The adhesive-bonding characteristics of the adhesive are defined by the value of the peeling, measured under the following conditions:

a- Preparation of the Test Specimens

Test specimens 290 mm long and 100 mm wide are cut out from a flexible polyethylene film containing decorative patterns and a polyamide textile mesh (25 gm$^2$).

The polyamide mesh test specimen is fixed to cardboard using staples (side with the small loops in contact with the cardboard), in order to facilitate subsequent handling thereof.

b- Evaluation of the Adhesive Bonding

The molten adhesive (100° C.) is poured onto a sheet of glass placed on a heating plate at 130° C. A film with a thickness of 50 mm (weight per unit area: approximately 5 g/m$^2$), with a length of 25 cm and with a width of 9 cm is formed using a film drawer preheated to 130° C. and the textile mesh is applied to this film. A slight pressure is exerted on the film and the assembly is removed from the sheet of glass and applied to the polyethylene test specimen, the face containing the patterns being in contact with the adhesive.

The assembly is placed in a press in a controlled-environment chamber at 23° C. and 50% relative humidity for 24 hours, it is then removed from the press and polymerization is allowed to proceed to completion under the abovementioned temperature and humidity conditions (of the order of 4 weeks).

The assembly is cut into strips with a width of 25 mm, the cardboard is removed and the outer polyethylene face is reinforced with an adhesive tape. The strips obtained are subjected to a 180° peel tension at a constant rate of 500 mm/min (Type DY 30 test machine; Adamel-L'Homargy). The measurements are carried out on 5 strips.

The peel strength is equal to 5 N/25 mm.

The adhesive is used for carrying out the industrial lamination of a polyethylene film on a polyamide textile mesh (20 g/m$^2$). The molten adhesive at 110° C. is deposited by means of a lip nozzle on the textile mesh which progresses at the rate greater than 150 meters per minute.

It is found that there exists no wicking up of the adhesive on the nozzle and that the wetting of the mesh by the adhesive is satisfactory. It is also observed that the adhesive does not pass through the textile mesh.

EXAMPLE 2

Comparative

The preparation is carried out under the conditions of Example 1, modified in that use is made of 30 parts by weight of Desmodur® N3300, 25 parts by weight of Dynacoll® 7250, 45 parts by weight of Dynacoll® 7130 and 0.01 part by weight of DBTL, and in the absence of Vestoplast® 508.

A white adhesive is recovered which is solid at 23° C. and which has an NCO content equal to 5.04%.

At 130° C., the adhesive is a white liquid, with a Brookfield viscosity equal to 25,800 mPa·s, which does not exhibit tackiness. On cooling, the adhesive exhibits high elasticity.

It is observed that the product wicks up on the nozzle and that wetting of the textile mesh by the adhesive is absent when the rate of progression of the textile mesh is greater than 10 meters per minute.

EXAMPLE 3

The following compounds are introduced into a reactor under a nitrogen atmosphere:

25.7 parts by weight of hexamethylene diisocyanate isocyanurate (NCO content: 21.6±0.3%; Brookfield viscosity: 3250±750 mPa·s at 23° C.; free hexamethylene diisocyanate: <0.2% by weight; trade name: Desmodur® N3300-Bayer), 34.1 parts by weight of the condensation product of a mixture of 1,3-benzenedicarboxylic acid and adipic acid and of a mixture of 1,4-benzenedicarboxylate, 2,2-dimethyl-1,3-propanediol, 1,2-ethanediol and 3-hydroxy-2,2-dimethylpropyl 3 hydroxy-2,2-dimethylpropyl 3-hydroxy-2,2-dimethylpropoanate (aliphatic/aromatic polyester polyol; hydroxyl number: 31–39; molecular mass: 3000; OH functionality: 2; trade name: Dynacoll® 7130-Hüls), 34.1 parts by weight of a copolymer of ethylene oxide and propylene oxide (polyether polyol; molecular mass: 3800; OH functionality: 2; trade name: Voranol® EP 1900-DOW CHEMICALS), 0.004 part by weight of an organobismuth compound (trade name: Coscat® 83-CAMBREX COMPANY).

The mixture is brought to a temperature of the order of 85 to 90° C. After 2 hours of reaction, 6 parts by weight of copolymer of ethylene, of 1-propene and of 1-butene (molecular mass: 11,800; glass transition temperature: −31° C.; viscosity at 190° C.: 7800 mPa·s; ring-and-ball softening point (DIN Standard 52011): 86° C.; trade name: Vestoplast® 508-Hüls) are introduced into the reactor.

After completion of the reaction, a white adhesive is recovered which is solid at 23° C. and which has an NCO content equal to 3.9%, measured according to AFNOR Standard T52-132.

At 110° C., the adhesive is a white homogeneous liquid, which exhibits a strong tackiness and a Brookfield viscosity equal to 66,000 mPas. On cooling, the adhesive exhibits high elasticity.

The adhesive is used for carrying out the industrial lamination of a polyethylene film on a polyamide textile mesh in the conditions described at Example 1.

It is found that there exists no wicking up of the adhesive on the nozzle and that the wetting of the mesh by the adhesive is excellent.

What is claimed is:

1. A moisture-crosslinkable polyurethane adhesive, comprising:
    a) 70 to 95% by weight of a polyurethane prepolymer obtained by polyaddition of at least one polyol to at least one dusocyanate trimerized as isocyanurate, wherein said polyol is a polyester polyol having an average molecular mass of between 250 and 7,000 and an OH functionality of between 2 and 3; and
    b) 5 to 30% by weight of an essentially amorphous poly-α-olefin,
said adhesive comprising a content of free NCO groups representing 1 to 20% by weight of the adhesive.

2. A moisture-crosslinkable polyurethane adhesive, comprising:
    a) 70 to 95% by weight of a polyurethane prepolymer obtained by polyaddition of at least one diisocyanate trimerized as isocyanurate, wherein said polyol is a polyester polyol that:
        i) has an average molecular mass of between 250 and 7,000 and an OH functionality of between 2 and 3, and
        ii) is a condensation product of polyols chosen from ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythriol, mannitol, triethanolamine, N-methyldimethanolamine and mixtures of these compounds with an acid, an unsaturated anhydride, or a lactone; and
    b) 5 to 30% by weight of an essentially amorphous poly-α-olefin,
said adhesive comprising a content of free NCO groups representing 1 to 20% by weight of the adhesive.

3. A moisture-crosslinkable polyurethane adhesive, comprising:
    a) 70 to 95% by weight of a polyurethane prepolymer obtained by polyaddition of at least one polyol to at least one diisocyanate trimerized as isocyanurate, wherein said polyol is a polyester polyol that:
        i) has an average molecular mass of between 250 and 7,000 and an OH functionality of between 2 and 3, and
        ii) is a condensation product of ethanediol, 1,3-propanediol and/or 1,6-hexanediol with adipic acid and/or phalic acid; and
    b) 5 to 30% by weight of an essentially amorphous poly-α-olefin,
said adhesive composing a content of free NCO groups representing 1 to 20% by weight of the adhesive.

4. A moisture-crosslinkable polyurethane adhesive, comprising:
    a) 70 to 95% by weight of a polyurethane prepolymer obtained by polyaddition of at least one polyol to at least boric disoocyanate trimerized as isocyanurate, wherein the polyurethane prepolymer is a reaction product of:
        a mixture of polyols comprising 20 to 100% by weight of an aliphatic polyester polyol and of 0 to 80% by weight of an aliphatic/aromatic polyester polyol and of at least one diisocyanate trimerized as isocyanurate; and
    b) 5 to 30% by weight of an essentially amorphous poly-α-olefin,
said adhesive comprising a content of free NCO groups representing 1 to 20% by weight of the adhesive.

5. A moisture-crosslinkable polyurethane adhesive, comprising:
    a) 70 to 95% by weight of a polyurethane prepolymer obtained by polyaddition of at least one polyol to at least one diisocyanate trimerized as isocyanurate, wherein the polyurethane prepolymer is a reaction product:
        of a mixture of polyols comprising 30 to 50% by weight of an aliphatic polyester polyol and of 70 to 50% by weight of an aliphatic/aromatic polyester polyol and of at least one diisocyanate trimerized as isocyanurate, and;
    b) 5 to 30% by weight of an essentially amorphous poly-α-olefin,
said adhesive comprising a content of free NCO groups representing 1 to 20% by weight of the adhesive.

6. A moisture-crosslinkable polyurethane adhesive, comprising:
    a) 70 to 95% by weight of a polyurethane prepolymer obtained by polyaddition of at least one polyol to at least one diisocyanate trimerized as isocyanurate, wherein said polyol is a polyester polyol that:
        i) has an average molecular mass of between 250 and 7,000 and an OH functionality of between 2 and 3, and
        ii) is a condensation product of polyols chosen from ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldimethanolamine and mixtures of these compounds with an acid, an unsaturated anhydride, or a lactone, wherein said acid is 1,6-hexanedioic acid, dodecanedioic acid, azelaic acid, sebacic acid, adipic acid, 1,18-octadecanedioic acid, phthalic acid, succinic acid or mixtures of these acids; and
    b) 5 to 30% by weight of an essentially amorphous poly-α-olefin,
said adhesive comprising a content of free NCO groups representing 1 to 20% by weight of the adhesive.

7. A moisture-crosslinkable polyurethane adhesive, comprising:
    a) 70 to 95% by weight of a polyurethane prepolymer obtained by polyaddinon of at least one polyol to at least one dusocyanate trimerized as isocyanurate, wherein said polyol is a polyester polyol that:
        i) has an average molecular mass of between 250 and 7,000 and an OH functionality of between 2 and 3, and ii) is a condensation product of polyols chosen from ethanediol 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldimethanolamine and mixtures of these compounds with an acid, an unsaturated anhydride, or a lactone, wherein said unsaturated anhydride is maleic or phthalic anhydride; and b) 5 to 30% by weight of an essentially amorphous poly-α-olefin, said adhesive comprising a content of free NCO groups representing 1 to 20% by weight of the adhesive.

8. A moisture-crosslinkable polyurethane adhesive, comprising: a) 70 to 95% by weight of a polyurethane prepolymer obtained by polyaddition of a at least one polyol to at least one diisocyanate trimerized as isocyanurate, wherein said polyol is a polyester polyol that:

i) has an average molecular mass of between 250 and 7,000 and an OH functionality of between 2 and 3, and ii) is a condensation product of polyols chosen from ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythyritol, mannitrol, triethanolamine, N-methyldimethanolamine, and mixtures of these compounds with an acid, an unsaturated anhydride, or a lactone, wherein said lactone is caprolactone; and b) 5 ro 30% by weight of an essentially amorphous poly-α-olefin, said adhesive comprising a content of free NCO groups representing 1 to 200% by weight of the adhesive.

* * * * *

UNITED STATES PATENT AND TRADEMARK OFFICE
CERTIFICATE OF CORRECTION

PATENT NO. : 6,635,711 B1
APPLICATION NO. : 09/622005
DATED : October 21, 2003
INVENTOR(S) : Michel Miskovic et al.

It is certified that error appears in the above-identified patent and that said Letters Patent is hereby corrected as shown below:

Col. 7, Claim 1, line 5, replace "dusocyanate" with --diisocyanate--.

Col. 7, Claim 2, line 14, replace "pentaerythriol" with --pentaerythritol--.

Col. 7, Claim 3, line 12, replace "phalic" with --phthalic--.

Col. 8, Claim 4, line 5, replace "boric" with --one--.

Col. 8, Claim 4, line 5, replace "disoocyanate" with --diisocyanate--.

Col. 8, Claim 7, line 4, replace "polyaddinon" with --polyaddition--.

Col. 8, Claim 7, line 5, replace "dusocyanate" with --diisocyanate--.

Col. 9, Claim 8, line 3, delete "a".

Col. 10, Claim 8, line 13, replace "mannitrol" with --mannitol--.

Col. 10, Claim 8, line 21, replace "200%" with --20%--.

Signed and Sealed this

Thirty-first Day of March, 2009

JOHN DOLL
*Acting Director of the United States Patent and Trademark Office*